United States Patent [19]

Magel et al.

[11] Patent Number: 5,155,778
[45] Date of Patent: Oct. 13, 1992

[54] OPTICAL SWITCH USING SPATIAL LIGHT MODULATORS

[75] Inventors: Gregory A. Magel, Dallas; T. Gus McDonald, Plano, both of Tex.

[73] Assignee: Texas Instruments Incorporated, Dallas, Tex.

[21] Appl. No.: 723,105

[22] Filed: Jun. 28, 1991

[51] Int. Cl.[5] .............................................. G02B 6/26
[52] U.S. Cl. ..................................... 385/18; 359/42; 359/223; 359/850; 385/35
[58] Field of Search ............... 350/96.15, 96.16, 96.17, 350/96.18, 96.19, 96.20, 338, 356, 360, 363, 486, 487, 607, 608, 611–613; 385/16–18, 31, 35, 37, 39, 33; 359/38, 39, 42, 223, 224, 245, 291, 297, 846, 847, 849, 850, 851

[56] References Cited

U.S. PATENT DOCUMENTS

| | | | |
|---|---|---|---|
| 4,811,210 | 3/1989 | McAulay | 350/96.15 X |
| 4,856,863 | 8/1989 | Sampsell et al. | 350/96.16 |
| 4,859,012 | 8/1989 | Cohn | 350/96.18 X |
| 5,071,232 | 12/1991 | Kato et al. | 385/33 X |

*Primary Examiner*—John D. Lee
*Attorney, Agent, or Firm*—Julie L. Schneider; James C. Kesterson; Richard L. Donaldson

[57] ABSTRACT

A structure for optical interconnection is disclosed along with methods of manufacture and operation. In one embodiment, the structure consists of optical fibers connected to an array of microlenses, either through integrated waveguides or not, that direct light onto a mirror formed in a substrate, which reflects light to a spatial light modulator. The spatial light modulator in turn reflects the light back to another mirror, which reflects the light through another microlens array, through integrated waveguides or not, and out another optical fiber. The structure is manufactured by forming the mirrors out of the substrate, forming waveguides if desired, forming troughs for the fibers and the microlenses, attaching external pieces such as the fibers, the lenses, and the spatial light modulator package, and packaging the device to maintain alignment.

34 Claims, 5 Drawing Sheets

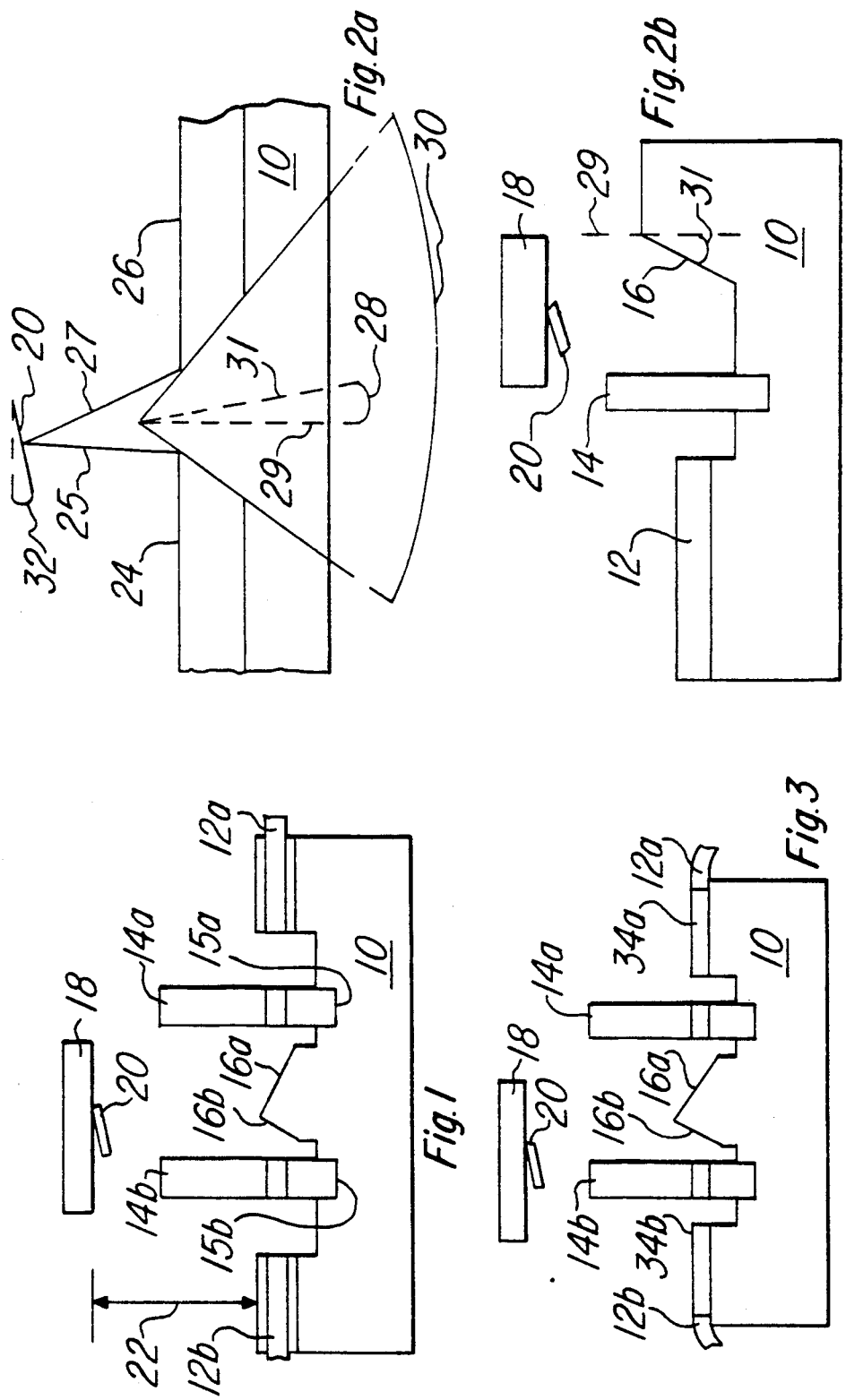

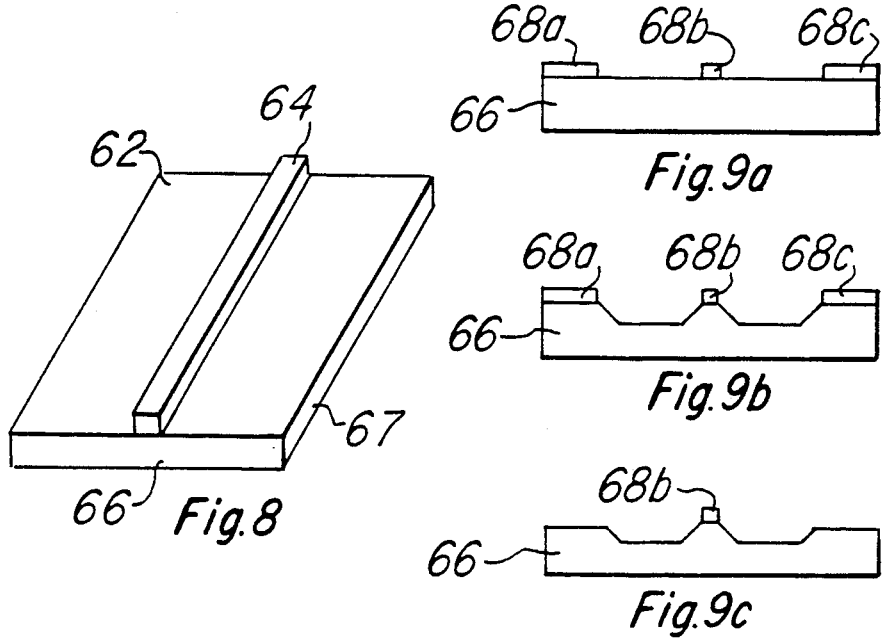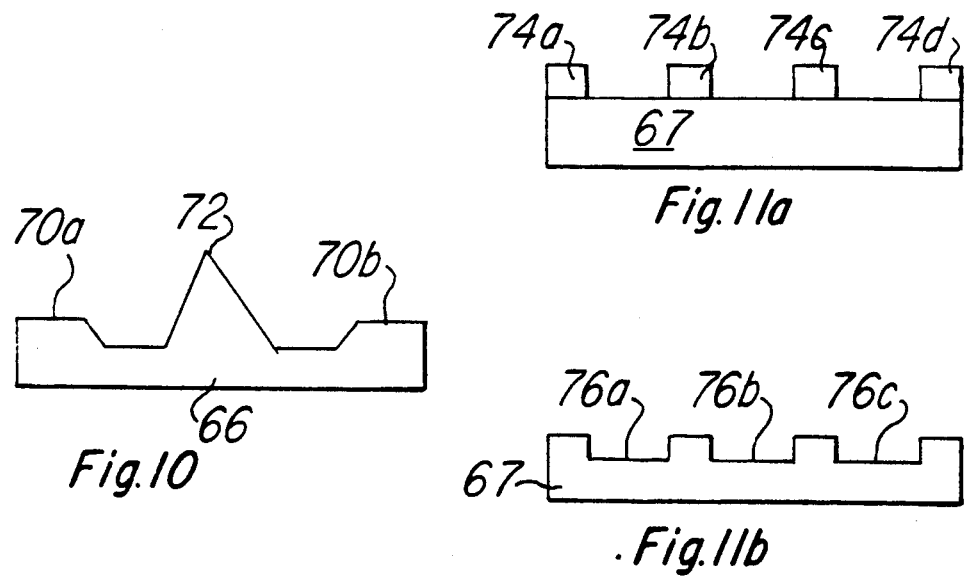

OPTICAL SWITCH USING SPATIAL LIGHT MODULATORS

BACKGROUND OF THE INVENTION

1. Field of the Invention

This invention deals with fiber optic switches, more specifically with packaging for fiber optic switches.

2. Background of the Invention

Switching for fiber optics has previously largely been done in the optoelectronic realm. The fiber optics, which are purely optical, have been coupled with circuitry that allows the switching to be done electrically, and then the signals are converted back to optical for transmission. This is slower and more complicated than using purely optical techniques, where the switching is done optically.

Purely optical switching has been achieved in many ways. One of which is accomplished by use of a liquid crystal (LCD) spatial light modulator to transmit or not transmit light through the switching network resulting in the switching operation. This method has a slow response time and there is the difficulty of alignment.

Another of these methods involves the use of a electro-optic crystalline material such as $LiNbO_3$. But, $LiNbO_3$ waveguide switches have been limited to use with a single-mode fiber. These switches are also currently polarization dependent although work is underway to eliminate this dependency.

Yet another of the ways to achieve optical switching is with the use of the deformable mirror device (DMD) spatial light modulator. The DMD operates in the reflective mode. The DMD is controlled to reflect light by individually controlling each member of an array of mirrors. There exist other patents that have issued or have been filed that apply to this concept. They are U.S. Pat. Nos. 4,811,210, 4,859,012, 4,856,863 which are incorporated by reference herein.

Connectors designed to hold fibers and DMDs in relative alignment previously have been made out of various materials such as aluminum and delrin. These materials are machined or molded to obtain the final desired shape. The fiber arrays are held at an angle relative to each other and the end package.

Many limitations of this approach exist, including manufacturability, cost, size, and complexity. The manufacturing necessary, either machining or molding introduces inaccuracy and instabilities in the final package. This manufacturing process is also labor intensive and therefore expensive.

The size of the connector required to accommodate two or more fiber arrays is relatively large. Further more, to achieve the desired angles relative to the other fiber arrays and the end package, the fibers must be supported as they exit the back of the arrays. This occupies still more space, and leads to switch installation complexity. Also, connectors of the necessary size and weight are prone to instabilities from vibrations and thermal effects.

Additionally, the fact that the fiber ends are held up far above the plane at which the switching occurs introduces a strong possibility of accidental physical interaction with a part of the switch, resulting in operational instability.

SUMMARY OF THE INVENTION

Objects and advantages will be obvious, and will in part appear hereinafter and will be accomplished by the present invention which provides a structure for optical interconnection. The structure comprises a mirror or mirrors formed out of the substrate, a microlens array for focusing the light, optical fibers that connect to the substrate, and a spatial light modulator package that is attached either on top of or below the substrate that holds the mirrors. A modification of this structure includes the use of optical waveguides for transmission between the fibers and the microlenses.

The device operates, in one embodiment, by reflecting light out of the plane of the fibers off of one mirror, to the spatial light modulator. The spatial light modulator then modulates the light, which reflects back to another mirror. This second mirror redirects the light so that it travels out another fiber. Further, the light could be transmitted after having its phase or amplitude modulated, or not transmitted at all, acting like an ON/OFF switch.

BRIEF DESCRIPTION OF THE DRAWINGS

FIG. 1 shows an embodiment of an optical switch.

FIG. 2a shows ray-optics geometries for a two-sided mirror switch.

FIG. 2b shows a one-sided mirror embodiment of an optical switch.

FIG. 3 shows an alternate embodiment of an optical switch.

FIGS. 8–11b shows a wafer as it moves through the manufacturing process.

DETAILED DESCRIPTION OF THE PREFERRED EMBODIMENT

Figure 4:
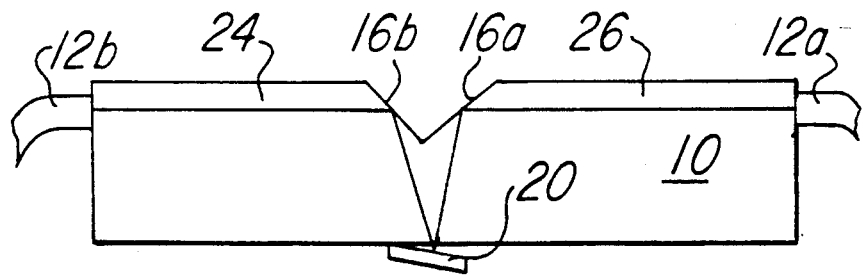
FIG. 4 shows an optical switch that operates through the substrate.

The concept of using orientation-dependent etching (ODE) to form mirrors and alignment structures for coupling fibers to reflective spatial light modulators (SLMs) for use in switching or modulation in an optical interconnection network can be embodied in several ways, ranging from a low to a high level of integration.

One of the many possible configurations is shown in FIG. 1. This configuration uses a lower level of integration than most of the other possibilities. The silicon substrate 10 is etched to form the mirrors 16a and 16b. It is possible for the mirrors to be a separate piece, but this option makes the manufacturing more difficult due to alignment difficulties incurred in affixing a separate mirror. Lenses 14a and 14b are required to efficiently couple light from the input fiber 12b onto the SLM 18, with individually controlled reflective element 20, and from element 20 into the output fiber 12a. It is possible to have more than one input or output fiber. Only one is shown here for simplicity. The lenses 14a and 14b may be glued in place in properly dimensioned grooves 15a and 15b, fabricated by sawing or etching, for example. Not shown is a spacer that is used to position the SLM 18 the proper distance from the etched mirrors 16a and 16b. The spacer, in this embodiment, must be of thickness 22 to position the SLM 18 as shown. At this level of integration, the fibers may be held in grooves etched onto the same substrate as the mirrors, or the fibers may be held in separate v-groove blocks which are affixed to the substrate.

Light propagates into the device through fiber 12b which can be positioned and held in any of the ways discussed above. The light is focused by microlens 14b onto the etched mirror 16b. The light reflects off of mirror 16b to the SLM 18. SLM 18 has an individually controlled element 20 which is reflective. One of many examples of such a modulator is the deformable mirror device (DMD). In one of these embodiments, using the torsion beam configuration of the DMD, the following would be true. If the controlled element is "ON", or tipped as shown in FIG. 1, the light is reflected off of the element onto etched mirror 16a. The light then propagates through microlens 14a into fiber 16a and exits the device. If it is desired to have the fiber network channel 12b-12a "OFF," the element 20 is tipped the other way, which would direct the light away from the mirror 16b, and not allow the light to be coupled back into fiber 12a, and no light would exit the device. It is possible to use other spatial light modulators such as liquid crystals.

Modulation other than ON/OFF is possible. Liquid crystals, or other configurations of DMDs are just some of the many modulators that may be used to accomplish phase-only modulation, for example. Any spatial light modulator that is reflective can be used in the above discussion, and any spatial light modulator that can be used for phase or amplitude modulation may be used for other than ON/OFF.

The ray-optics geometry at the mirrors and the SLM is shown in FIG. 2a. The input ray 24 and the output ray 26 run parallel to the substrate. The included angle between the mirrors 30, $\theta_{incl}$, must be obtuse (>90°) in order for the return reflection from the mirror element 20 to displaced properly and to be redirected into the output channel 26 parallel to the substrate 10. In the case of a reflective SLM used at exactly normal incidence and one whose plane lies parallel to the substrate ($\theta_{tilt}=0$), where $\theta_{tilt}$ is reference number 32, the offset angle 28, $\theta_{off}$, which is between the bisector of the included angle 30 and the normal to the substrate, should be 0°, and the input and output rays 25 and 27 from the mirrors will be symmetrical about the normal to the substrate 29. If only one mirror is used as in FIG. 2b, the offset angle is the difference between the mirror angle, $\theta_{mirror}$, and 45°. If $\theta_{mirror}$ equals 45°, the offset angle equals 0. For use with a tilted deformable mirror device (DMD) pixel 20, as shown in FIG. 2a, a nonzero offset angle is necessary. As will be discussed in the fabrication process, this may be achieved, in the two mirror embodiment, by using a substrate which is cut at the proper angle off from a crystal plane direction. In the one mirror embodiment, this can be achieved in the same manner, or by proper choice of the mirror crystal plane.

FIG. 3 shows another of the many possible structures with a higher level of integration than the device in FIG. 1. In this embodiment, input fiber 12b is connected to integrated-optic waveguide 34b which can be monolithically manufactured upon the substrate 10. Similar to the previous discussion, the light propagates through the waveguide 34b to the microlens 14b to the first of the etched mirrors 16b. The light reflects off of the mirror to the SLM 18 with the individually controlled mirror element 20. It then reflects off of the element 20 and onto the mirror 16a. The light then propagates through the microlens 14a and into integrated-optic waveguide 34a to fiber 12a.

This higher level of integration offers many advantages. It allows for lithographic alignment of the input and output channels in the event that properly aligned fiber-holding v-grooves are unavailable because of the crystallographic orientation of the substrate chosen for the mirror etching process. Perhaps more importantly, integrated-optic components such as splitters, combiners and the like could be fabricated in these positions to further integrate the functionality of a complete device, such as a crossbar switch, in order to make a more monolithic package for the interconnection network. Accessory components such as polarizers, which may be required for the use of certain types of SLMs, could also be integrated into the package in a similar fashion. It is even conceivable that the microlenses could be replaced by integrated-optic components. It is difficult to achieve the lens performance required for this application, which demands large numerical aperture and high efficiency, but it is possible.

A different orientation of the SLM could be used with either of the levels of integration discussed. This configuration is shown in FIG. 4. The mirrors reflect light out of the input plane into the substrate. In this arrangement, the substrate must be transparent at the wavelength at which the package is to operate. Additional mirror coating (metal or dielectric) of the mirror surfaces, to be discussed under fabrication techniques, may be unnecessary if total internal reflection can be used. The advantage of this configuration is that a fully monolithic switch can be made with the SLMs arranged on the other surface of the substrate from the mirrors, where the process of arranging could be forming the spatial light modulator on the underside of the substrate. This variation thus has the potential for the highest degree of integration. The input and output channels 24 and 26 would be required to be inside the substrate. Waveguides in silicon have been demonstrated, but they have a tendency to be lossier than deposited dielectric waveguides, and there is a refractive index discontinuity between optical fibers and Si which could lead to unacceptable input and output coupling losses.

Figure 5:
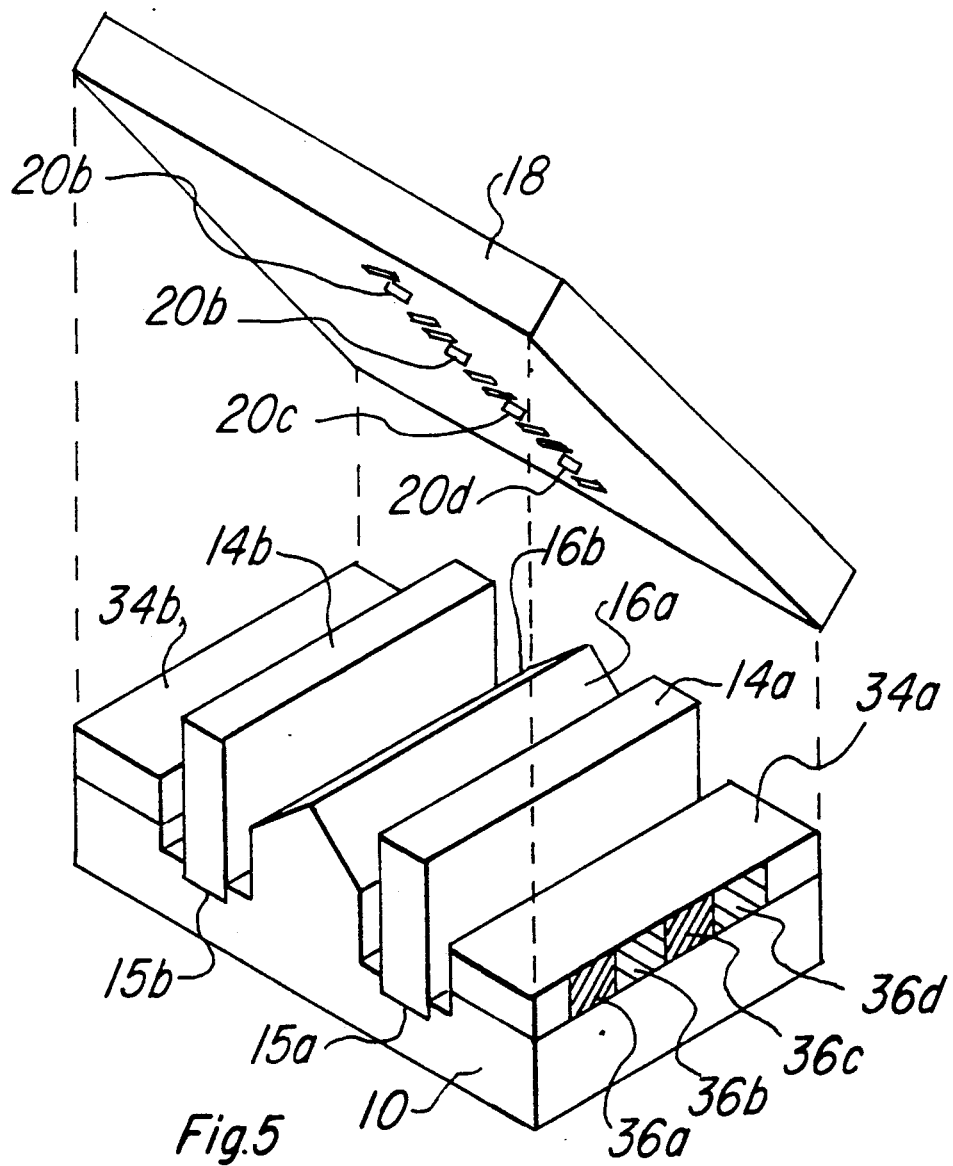
FIG. 5 shows a four-port optical switch.

The individual control of the mirror elements in the SLM becomes more apparent in FIG. 5. In this structure there are four fiber ports in the waveguides 34a and 34b. Because of the perspective, only the output ports 36a-36d can be seen. In this embodiment, the SLM 18 contains four individually controlled elements, 20a through 20d. Other embodiments are possible with any number of ports and elements selected as desired. The SLM 18 is shown detached from the substrate for viewing sake. As discussed earlier the SLM actually is positioned on top or bottom of the waveguides and microlenses. The mirrors 16a and 16b may be manufactured to run the width of the device, as may the microlens grooves 15a and 15b. As light enters the input ports, not shown, the ports which will be "ON" are selected independently from each other. In this embodiment, all ports 36a-36d could have light exiting, or only one or any combination thereof.

Figure 6:
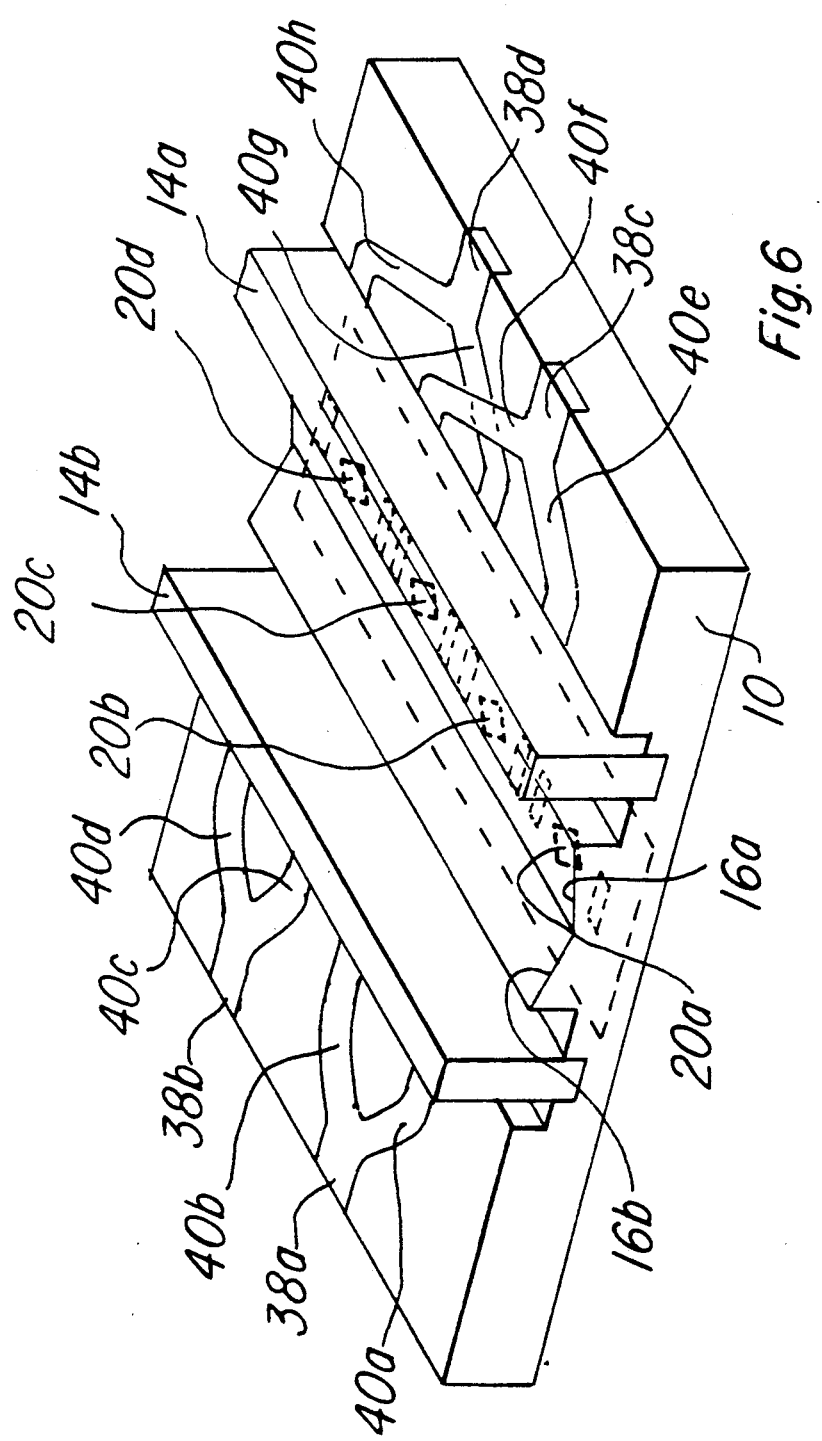
FIG. 6 shows a four-port optical switch with beam splitters and combiners.

A structure that has the integrated-optic splitters and combiners as discussed earlier and multiple input and output ports as in FIG. 5, is shown in FIG. 6. In FIG. 6, only two input and output ports are shown. As in all configurations discussed thusfar, the number of ports is not limited to any number except by what is desired by the designer. Light entering from the fibers, not shown, into the ports 38a and 38b, is split into four waveguides 40a–40d. The light is then modulated as in previous discussions, and is passed to waveguides 40e–40h. The light is then recombined in a different configuration from when it was split, and it exits the package at ports 38c and 38d. A structure of this type may be used as part of an optical crossbar switch with full broadcast capability.

Figure 7:
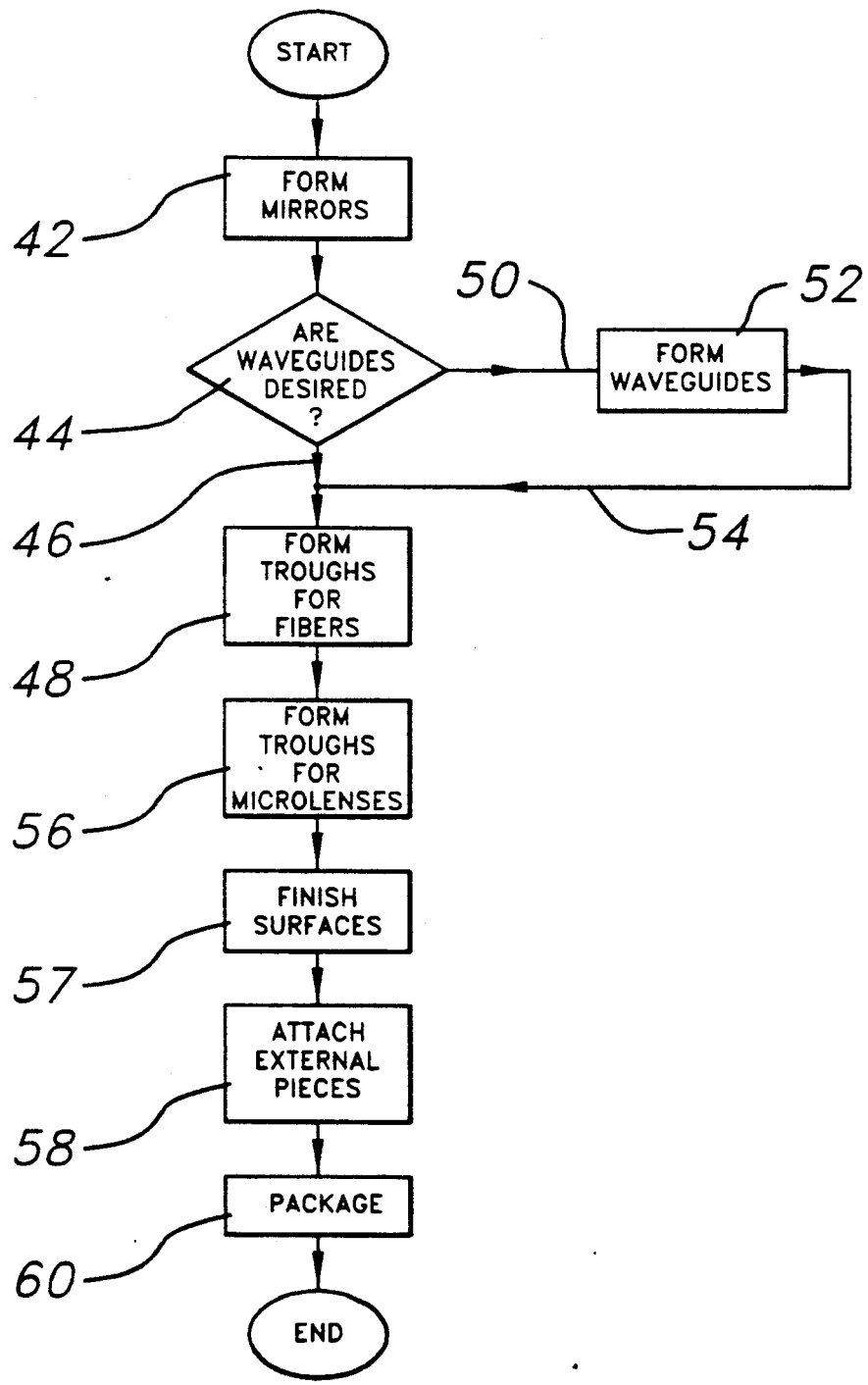
FIG. 7 shows a process flow for the manufacture of an optical switch.

FIG. 7 shows a manufacturing process flow that is one of many ways these devices could be made. In step 42, the mirrors are formed in the semiconductor substrate, such as silicon, gallium arsenide, or indium phosphide. To etch the reflective surfaces of the substrate, for this example silicon will be used, the <110> plane must be etched relative to the <111> plane. Due to the crystallographic nature of silicon this will give a 110 degree angle between reflective surfaces. The 110 degree angle needs to be tilted 2.5 degrees relative to the normal of the silicon plane so the light beam will exit the package parallel to the incoming beam for use with a DMD switch tilted at 5 degrees to allow transmission of light. This is accomplished by sawing the wafer 2.5 degrees off the <111> crystal axis when the wafer is sawed from the silicon ingot.

Preferential etching can be used to form mirrors in the silicon. In this example, the silicon wafer is cleaned, then placed into a tube furnace for an oxide growth. The wafer is then coated on one side with a positive photoresist, a photomask is aligned to the wafer, relative to the specific crystallographic planes and the wafer is exposed to ultraviolet (UV) radiation. The exposed wafer is removed then developed leaving open windows on the silicon oxide which are in turn etched in a buffered hydrofluoric solution. The remaining photoresist is removed leaving a silicon wafer covered by an oxide mask which is then placed into a potassium hydroxide solution for preferential etching.

An example of an area from such a wafer is shown in FIG. 8. For ease of identification in later drawings, a rectangular area is shown. Note that multiple devices of this type can be manufactured from each wafer. Oxide mask 64 rests upon the wafer 62 which has two sides, 66 and 67, showing. After the preferential etching has reached a predetermined depth, the wafer is pulled form the solution and cleaned. Another oxide growth and photoresist layer are applied to the wafer. The desired area is then exposed to UV light through another photomask, and developed leaving resist on the pedestal area which will eventually hold the optical fibers.

An example of this process is shown in FIGS. 9a–9c. The view in this drawing is taken from side 66 from FIG. 8. The pedestal areas, 68a and 68c are covered to prevent them from being etched, as is the tip of the mirrors, 68b. The wafer appears as shown in FIG. 9b after the first etch is done. To etch the pedestal areas, the mask areas 68a and 68b are removed, and the wafer is etched again. After the completion of that etch, the wafer appears as shown in FIG. 9c. After the preferential etching is completed the resultant wafer looks similar to FIG. 10. Again the view is from side 66 from FIG. 8. Pedestal area 70a and 70b and the apex of the mirror 72 are shown.

The process flow of FIG. 7 requires a decision from the designer in step 44. If waveguides are desired, the process travels along path 50 to step 52. To form the waveguides, a layer of lower cladding is formed upon the substrate. A possible material for this is silicon dioxide. The waveguide core layer, such as doped silicon dioxide, is then formed upon the lower cladding layer. The core is etched to form channel waveguides within it. A layer of upper cladding is formed on the core and patterned. The patterning must be such that the waveguide will be left where desired and removed where not desired, such as over the mirrors already formed in the substrate. After the patterning is done, the waveguide layers are etched, leaving the layers formed into channel waveguides as determined by the pattern.

If waveguides are not desired, the process steps through path 46 to step 48. Path 54 from step 52 also arrives at this step. Troughs for the optical fibers must be formed. This can be accomplished in many ways. They can be sawed in, a separate piece with pre-fabricated grooves could be glued on, or they could be etched in, to name a few. To etch the troughs, a plasma etch could be used. The wafer would undergo the same oxide, resist, mask, expose to UV, develop, etch, and remove resist process as discussed above. The wafer would then be exposed to a plasma etch until the desired troughs have been formed. The wafer before and after the etching of the troughs is shown in FIGS. 11a and 11b. The view in these drawings is from the side 67 from FIG. 8. Resist blocks 74a–74d in FIG. 11a ensure that the etch will result in the troughs 76a–76c in FIG. 11b. While this drawing only shows the use of three troughs, it is possible to have many more, as the designer desires. Additionally, the waveguide that was patterned and etched in the previous step can be used as the mask for the etch process. The patterning of the waveguide could include patterning thin extensions of the waveguide that run to the edge of the substrate. The gap between the thin extensions would then be etched, forming a v-groove in which to lay the fiber.

The process flow in FIG. 7 steps onto step 56. Troughs for the microlenses must be formed. For examples of the possible manufacturing of these grooves, they can be etched as above, or sawed with a diamond tipped saw. Step 57 is an optional step that includes coating of the mirrors, either with a metal or dielectric to improve reflectivity. Also as part of this step, the waveguide ends could be coated with an antireflection coating to improve throughput.

Step 58 in the process is the point where the external pieces are attached to the structure that was manufactured as above. The fibers are placed in their respective troughs and are aligned so their tips are all in the same plane and then permanently attached in place. The microlenses are placed in the troughs made for then and attached. The actual attachment can be made by many ways, one of which could be UV curing epoxy. The process moves to the final step 60, for packaging the above structure with the SLM package.

The SLM package can be attached either above the mirrors, or if internal reflection is being used, below the mirrors. The outer edges of the parts are coated with adhesive and the two halves are mated together. With predetermined mirrors from the SLM in the ON state, one part is moved relative to the other until maximum optical throughput is obtained. The package is now sealed to protect it against the elements and maintain system alignment for future use.

Thus, although there has been described to this point a particular embodiment for an optical switching package and technique, it is not intended that such specific references be considered as limitations upon the scope of this invention except in-so-far as set forth in the following claims.

What is claimed is:

1. A method of manufacturing an optical switch comprising:
   a. supplying at least one mirror on a first surface of a substrate such that said mirror is positioned to reflect light out of the plane of a substrate to a second plane, and wherein said first surface is substantially parallel to a second surface of said substrate;
   b. coupling said substrate with at least one optical fiber for transmission of light to and/or from said mirror;
   c. providing for at least one microlens array for focusing said light, arranged between said fiber and said mirror;
   d. arranging a spatial light modulator in said second plane adjacent said substrate for reflecting said light reflected from said mirror; and
   e. sealing said spatial light modulator to said substrate to form said switch.

2. The method of claim 1 wherein said supplying step comprises orientation dependent etching of the substrate.

3. The method of claim 1 wherein said coupling step comprises etching the substrate to form alignment features for said fibers and attaching said fibers.

4. The method of claim 1 wherein said coupling step comprises attaching external pieces with pre-fabricated alignment structures for fibers in said external pieces.

5. The method of claim 1 wherein said providing step comprises etching the substrate to form troughs and attching said microlenses.

6. The method of claim 1 wherein said providing step comprises sawing the substrate to form troughs and attaching said microlenses.

7. The method of claim 1 wherein said arranging step comprises arranging said spatial light modulator adjacent said first surface of said substrate.

8. The method of claim 1 wherein said arranging step comprises arranging said spatial light modulator adjacent said second surface of said substrate.

9. The method of claim 1 wherein said arranging step comprises forming said spatial light modulator on said second surface of said substrate.

10. A method of manufacturing an optical switch comprising:
    a. forming at least one mirror in a first surface of a substrate, wherein said first surface is substantially parallel to a second surface of said substrate;
    b. depositing waveguides upon said substrate for directing light to and/or from said mirror;
    c. coupling said waveguides with at least one optical fiber for transmission of light to and/or from said waveguides;
    d. providing for at least one microlens array for focusing said light, arranged between said waveguides and said mirror;
    e. arranging a spatial light modulator adjacent said substrate for reflecting said light reflected from said mirror; and
    f. sealing said spatial light modulator to said substrate to form said switch.

11. The method of claim 10 wherein said forming step comprises orientation dependent etching of the substrate.

12. The method of claim 10 wherein said coupling step comprises etching the substrate to form alignment features for said fibers and attaching said fibers.

13. The method of claim 10 wherein said coupling step comprises attaching external pieces with pre-fabricated alignment structures for fibers in said external pieces.

14. The method of claim 10 wherein said providing step comprises etching the substrate to form troughs and attching said microlenses.

15. The method of claim 10 wherein said providing step comprises sawing the substrate to form troughs and attaching said microlenes.

16. The method of claim 10 wherein said arranging step comprises arranging said spatial light modulator adjacent said first surface of said substrate.

17. The method of claim 10 wherein said arranging step comprises arranging said spatial light modulator adjacent said second surface of said substrate.

18. The method of claim 10 wherein said arranging step comprises forming said spatial light modulator on said second surface of said substrate.

19. An optical switch comprising:
    a. a first structure comprising:
       i. a substrate;
       ii. at least one mirror formed on said substrate such that said mirror reflects light out of the plane of the substrate to a second plane;
       iii. at least one optical fiber attached to said substrate for directing light to and/or from said mirror;
       iv. at least one microlens array attached to said substrate, between said mirror and said optical fiber, for focusing said light; and
    b. a second structure comprising a spatial light modulator, for reflecting light reflected from said mirror, wherein said second structure is arranged opposite to said first structure in said second plane.

20. The switch as in claim 19 wherein said substrate is silicon.

21. The switch as in claim 19 wherein said substrate is gallium arsenide.

22. The switch as in claim 19 wherein said substrate is indium phosphide.

23. The switch as in claim 19 wherein said mirror has a nonzero offset angle.

24. The switch as in claim 19 wherein said spatial light modulator comprises an array of individually deflectable mirror elements.

25. The switch as in claim 19 wherein said spatial light modulator comprises an array of liquid crystal devices.

26. An optical switch comprising:
    a. a first structure comprising:
       i. a substrate;
       ii. at least one waveguide;
       iii. at least one mirror formed in said substrate;
       iv. at least one optical fiber attached to said substrate for directing light to and/or from said waveguide;
       v. at least one microlens array attached to said substrate, between said mirror and said optical fiber, for focusing said light, such that said waveguide is positioned between said fiber and said microlens; and
    b. a second structure comprising a spatial light modulator, for reflecting light reflected from said mirror, wherein said second structure is arranged opposite said first structure.

27. The switch as in claim 26 wherein said substrate is silicon.

28. The switch as in claim 26 wherein said substrate is gallium arsenide.

29. The switch as in claim 26 wherein said substrate is indium phosphide.

30. The switch as in claim 26 wherein said mirror has a nonzero offset angle.

31. The switch as in claim 26 wherein said spatial light modulator comprises an array of individually deflectable mirror elements.

32. The switch as in claim 26 wherein said spatial light modulator comprises an array of liquid crystal devices.

33. A method of optical interconnection comprising:
   a. transmitting light through an optical fiber in a first plane;
   b. focusing said light with a lens;
   c. reflecting said light off a mirror out of said first plane to a second plane which contains a spatial light modulator;
   d. using said spatial light modulator to reflect light out of said second plane to a mirror in said first plane; and
   e. focusing a portion of any light reflected from said mirror in said first plane into an optical fiber.

34. A method of optical interconnection comprising:
   a. transmitting light through an optical fiber in a first plane;
   b. receiving light from said optical fiber into a waveguide for further transmission of light;
   c. focusing said light with a lens;
   d. reflecting said light off of a mirror out of said first plane to a second plane which contains a spatial light modulator;
   e. using said spatial light modulator to reflect light out of said second plane to a mirror in said first plane;
   f. focusing a portion of any light reflected from said mirror in said first plane into a waveguide: and
   g. transmitting light from said waveguide to an optical fiber.

* * * * *